Dec. 28, 1965    R. S. WADDINGTON ETAL    3,225,973
GROMMET APPLIANCES
Filed July 12, 1963
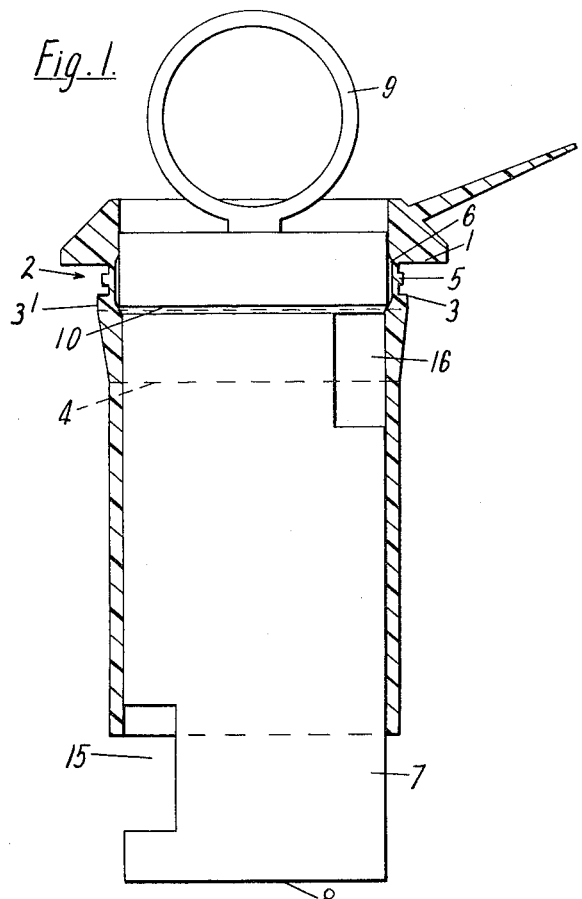
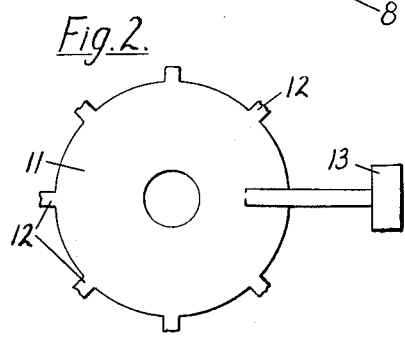
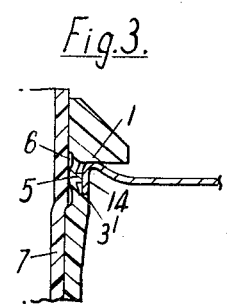

United States Patent Office 3,225,973
Patented Dec. 28, 1965

3,225,973
GROMMET APPLIANCES
Rogor Strange Waddington, 6 Magdalene House, Manor Fields, Putney, London, England, and Bruce Duval, "Toftrees," Church Road, Woldingham, England
Filed July 12, 1963, Ser. No. 294,675
Claims priority, application Great Britain, July 13, 1962, 26,962/62
7 Claims. (Cl. 222—522)

The present invention relates to grommet fittings.

Grommet fittings made of flexible material, usually natural or synthetic rubber, are employed in various applications such as glands for sealing a cylindrical body in fluid-tight relationship with an aperture in for example a liquid container or a chamber of which the interior is required to be isolated from the atmosphere; they are grooved or otherwise formed externally to engage the aperture whilst being located axially thereby. The cylindrical body to be sealed in said liquid-tight relationship may for example be a liquid dispensing tap, a conduit or an actuating rod. For the purposes of the present specification the term "cylindrical body" is intended to include bodies which are cylindrical where they are to pass through the fittings, irrespective of whether those bodies are cylindrical elsewhere.

With grommet fittings as provided hitherto other than fittings formed of natural rubber or other rubber-like material of substantial wall thickness, it has been difficult to achieve external fluid-tightness, i.e. fluid-tightness between the fitting and the aperture. In the case of glands for the foregoing purpose attempts to ensure external fluid-tightness have tended to introduce unwanted stiffness of movement between the gland and the cylindrical body. The problem has been especially troublesome where it has been necessary to accept wide tolerances in the size and shape of the aperture as for example in the now commercially important case of the axially short filling apertures of neckless containers. Typically, the manufacture tolerance on the diameter of the filling aperture of neckless containers mass produced from tin plate is about 0.009" for a nominal diameter of 1¼" and an ovality amounting to as much as 0.008" is commonly encountered. Glands formed of relatively hard flexible resinous material, such as polythene of bottle blowing quality, have been conspicuously less satisfactory under these conditions than rubber glands and have indeed frequently shown objectionable leakages.

In accordance with the present invention the foregoing difficulties are minimised by forming the aperture engaging part of the fitting with a longitudianl cross section arranged to promote radially inward deformation by reaction with the aperture. Such a cross section is achieved by forming the gland internally with a shallow circumferential groove dimensioned and positioned to permit the deformation and externally with a circumferential rib for radial engagement with the aperture. A groove or rib, provided alone, can give satisfactory external fluid-tightness with apertures having an interference fit with the fitting. The amount of interference is non-critical and such external fluid-tightness is obtainable consistently over the range of tolerances encountered in practice without recourse to rubber-like material.

However, in the case of a gland used as aforesaid, a groove or rib alone tends to leave an often unwelcome degree of stiffness of movement of the cylindrical body. For example, a groove alone ensures that the stiffness is low enough for many applications, such as arrangements in which the cylindrical body is required only to be rotatable. It remains significant however, especially with relatively greatly under-sized apertures, for arrangements in which the cylindrical body is required to reciprocate axially, being even troublesome for bodies having ports disposed for movement through the gland. The simultaneous provision of the rib improves performance in this respect to an extent such that the gland is rendered suitable for general application, difficult stiffness only occurring in extreme cases.

Reference has been made herein to the fitting being formed externally to engage the aperture. A preferred external formation is a groove dimensioned for engagement with an axially short aperture such as the filling aperture of a neckless container. In this case, as in other cases, a fitting provided in the form of a gland may be formed such that it must be crumpled and applied to the aperture before the cylindrical body is inserted. Alternatively it may be provided in a form which permits its insertion with the cylindrical body already positioned therethrough, even though the cylindrical body be rigid enough to support the internal surface of the fitting against deformation. To this end the fitting may be formed to one side of the groove with a section whose external diameter increases in the direction of the groove to a maximum diameter which is insufficient, and preferably just insufficient, to prevent sufficient deformation of the material to allow the section to be pushed through the aperture whilst the gland is held supported internally by a rigid cylindrical body.

It is found that a maximum diameter just insufficient to prevent insertion of the fitting through the aperture whilst the gland is held supported internally has the effect that the gland cannot, whilst occupied by a rigid cylindrical body, be withdrawn without damaging the assembly.

The following description in which reference is made to the accompanying drawing is given in order to illustrate the invention.

In the drawing:

FIGURE 1 shows a grommet gland in accordance with the invention fitted with a reciprocable tap, FIGURE 2 shows a transit seal for the gland, and FIGURE 3 shows in cross section, on an enlarged scale, part of the gland in operative engagement with the edge of the filling aperture of a neckless container.

Referring now to FIGURE 1 the gland shown therein comprises a sleeve injection moulded from polythene of bottle blowing quality and chosen for its high environmental stress crack resistance and good flex crack resistance. It has a specific gravity of 0.920 to 0.929, a melt flow index of 0.51 to 1.0 and a stiffness modulus of 21,300 lbs./sq. in. At its inner end the gland is formed with a circumferential shoulder 1 for limiting its penetration into a neckless container. On its underside the shoulder 1 defines one side of a circumferential groove 2, the opposite side of which is defined by a shoulder 3 of radial height 0.07" bounded by a short cylindrical section 3' from which the outer surface of the gland tapers uniformly at 5° to level 4, beyond which the outer surface of the gland is cylindrical. Within the groove 2 the gland is formed with a circumferential rib 5 of width 0.037" and radial height 0.040". The inner surface of the gland has a circumferential groove 6, of depth 0.010", substantially wider than the groove 2, and positioned such that the shoulder 1 and the shoulder 3 both lie on the axial length thereof. The thickness of material between the bases of the grooves 2 and 6 is 0.06".

Slidably held within the gland is a reciprocable liquid delivery tap 7 in the form of a hollow cylinder closed at its lower end 8. It is also closed near its upper end to provide a recess within which is positioned the base of an integral handle 9. The internal diameter of the gland is slightly less from the lower edge of the groove 6 than from the upper edge thereof. The external diameter of the tap is correspondingly increased at 10 so as to provide an abutment limiting passage of the tap inwardly through the gland by engagement with the lower side of the groove 6.

The gland and tap are provided together as a closure and dispensing assembly for a neckless container and in order to prevent undetected withdrawal of the contents of the container during transit the gland is provided at its upper end with a tear off transit seal 11. This seal is shown in the torn-off condition in FIGURE 2. It consists of a domed disc which has been united integrally with the gland by narrow radial projections 12 formed to break at their junctions with the gland when the seal is pulled away by a tag 13. When the assembly is pushed into position in the filling aperture, bounded by the inwardly projecting flange 14 of a neckless liquid container (FIGURE 3), the circumferential ridge 5 engages the wall of the flange and is pressed radially inwardly so that the base of the groove 6 is curved as shown in FIGURE 3.

With the mass produced containers employed, the interference between the outer diameter of the rib 5 and the inner diameter of the filling aperture is from 0.003 to 0.012" and the maximum diameter of the tapered portion below the groove is insufficient to prevent the assembly being inserted into position. When the assembly has been inserted the inner edge of the flange 14 engages the lower side of the groove 2. The maximum diameter of the tapered section (and the diameter of the cylindrical section 3') are such that although the assembly can be inserted, it cannot be withdrawn without damage to the gland or the container as long as the tap 7 is in position.

The tap shown has a filling port 15 and an emptying port 16 positioned as shown so that one of them is always closed by the gland when the other is open. Reciprocation of the tap accordingly results in delivery of liquid from the container in a series of identical quantities. In spite of the need for port 16 to pass through the gland, and the variation in dimensions of the filling aperture from can to can, reciprocation is obtained without objectionable stiffness. Moreover the arrangement provides a consistently excellent external fluid-tightness, the form of curvature at the base of the groove 2, induced by cooperation between the rib 5 and the circumferential groove 6, contributing to provide a close mating fit. Heretofore, these consistent results have been obtainable only with grommet glands formed of rubber-like elastomeric material with a considerable wall thickness.

We claim:

1. A grommet fitting comprising a tubular member shaped externally to engage an aperture while being positively located axially thereby, characterized in that the tubular member is formed at the aperture engaging part thereof with a shallow internal circumferential groove bounded by a pair of internal circumferential shoulders and with an external circumferential rib positioned to surround an axially intermediate portion of the groove and to lie between and clear of the internal circumferential shoulders in the axial direction of the member.

2. A grommet fitting which comprises a tubular member provided firstly with a pair of external flanges whose adjacent surfaces are spaced apart in the axial direction of the tubular member by a distance which is small in comparison with the external diameter of the tubular member between the external flanges, secondly, with a shallow internal circumferential groove bounded by a pair of shoulders both of which lie outside said flanges adjacent surfaces in the axial direction of the tubular member and, thirdly, with an external circumferential rib of lesser width in the radial direction than either of the external flanges and positioned between the external flanges, to surround an axially intermediate portion of the internal circumferential groove.

3. A grommet fitting according to claim 2 in which one of the external flanges is substantially wider, in the radial direction than the other of the external flanges and the tubular member is shaped externally to provide an externally tapered section adjacent to the said other of the external flanges over which the external diameter of the tubular member decreases from the external diameter of said other of the external flanges with distance therefrom.

4. A dispensing apparatus for a container which comprises a grommet fitting, a liquid delivery tap reciprocable within the grommet fitting in liquid-tight relationship therewith, external circumferential shoulders on the grommet fitting defining therebetween an external groove for locating the grommet fitting axially with respect to the container, a circumferential groove, of greater width than the external groove formed internally within the grommet fitting in such an axial position as to have an axially intermediate part thereof surrounded by the external groove and, between the external shoulders, an external circumferential rib positioned to surround an axially intermediate part of the groove formed internally within the grommet fitting.

5. A liquid container which comprises a liquid container having an axially short filling aperture, a grommet fitting within the filling aperture and located axially with respect to the filling aperture by a flange outside the container and a flange within the container, an external circumferential rib on the grommet fitting bearing radially against the filling aperture in liquid-tight relationship therewith, a circumferential groove formed internally within the grommet fitting and being of such axial width, and so positioned, that the external circumferential rib surrounds an axially intermediate part of the circumferential groove, and a liquid dispensing tap reciprocable axially in liquid-tight relationship within the grommet fitting.

6. A liquid container according to claim 5 in which the grommet fitting is formed of thermo-plastic material of bottle-blowing quality and the external circumferential rib has an interference fit of from 0.003 to 0.012" with the filling aperture.

7. A grommet fitting comprising a tubular member shaped externally to engage an aperture while being positively located axially thereby, characterized in that the tubular member is formed at the aperture engaging part thereof with a shallow internal circumferential groove bounded by a pair of internal circumferential shoulders and with an external circumferential rib positioned to surround an axially intermediate portion of the groove and to lie between and clear of the internal circumferential shoulders in the axial direction of the member, the internal diameter of the tubular member being greater at one side of the internal circumferential groove than at the other side thereof and the shoulder bounding the groove at said one side being correspondingly wider in the radial direction than is the shoulder bounding the groove at said other side.

References Cited by the Examiner
UNITED STATES PATENTS

| | | | |
|---|---|---|---|
| 2,763,403 | 9/1956 | Livingstone | 222—570 X |
| 2,920,799 | 1/1960 | Binder | 222—570 X |
| 2,923,446 | 2/1960 | Ankney | 222—570 |
| 2,980,300 | 4/1961 | Waddington et al. | 222—570 X |
| 2,993,629 | 7/1961 | Ruhnke | 222—570 X |
| 3,059,822 | 10/1962 | Eisendrath et al. | 222—566 |
| 3,113,706 | 12/1963 | Wickman | 222—570 X |
| 3,125,259 | 3/1964 | Young | 222—541 |

LOUIS J. DEMBO, *Primary Examiner.*